ELECTRICAL SIGNAL POWER SUPPLY TRANSFER CIRCUIT

Filed Feb. 28, 1955 2 Sheets-Sheet 1

INVENTOR.
JOHN W. GRAY
BY
H. A. Mackey
ATTORNEY

INVENTOR.
JOHN W. GRAY
BY H. L. Mackey
ATTORNEY

United States Patent Office 2,812,482

Patented Nov. 5, 1957

2,812,482

ELECTRICAL SIGNAL POWER SUPPLY TRANSFER CIRCUIT

John W. Gray, Pleasantville, N. Y., assignor to General Precision Laboratory Incorporated, a corporation of New York Application February 28, 1955, Serial No. 490,833

11 Claims. (Cl. 318—28)

This invention relates to devices for changing electrical signals from one kind to another kind and more specifically to devices which are alternatively useful for converting signals in terms of alternating current to signals in terms of direct current and for converting signals in terms of direct current to signals in terms of alternating current.

In operating electronic apparatus the voltage regulation of the power supply is frequently of interest. When the voltage regulation is such that changes in voltage are not negligible, the effects of such changes can be largely neutralized by applying the supply voltage at two or more points of the circuit in such manner that the effects of voltage supply changes cancel and have no net effect upon the operation of the apparatus. Therefore, in general, if a signal applied to a linear device fluctuates with supply fluctuations, it is desirable that the output signal should fluctuate similarly. It is thus important to have the same voltage supply available for application to selected points of the circuit. However, when both alternating and direct current supplies are employed in the same device, or alternating supplies of different frequencies, a signal subjected to the variations of one supply may later be subjected to variations of the other supply, and since the two supply variations are independent of each other, the variations of one cannot be made to cancel the other insofar as they affect the signal.

One application in which such a situation arises is in connection with analog computers, posing the problem of converting an analog representation of some physical quantity from an alternating voltage to a direct current analog, or vice versa.

There has been in the past only one relatively uncomplicated way to solve this problem accurately. This classical method employs two voltage dividers which are required to be of high quality because their errors are inherently introduced into the output signal. The voltage dividers are powered by alternating and direct current respectively, and are mounted on the same shaft for operation in concert by a servomechanism. One slider is employed as the input and the other as the output. It may be shown that in this circuit the probable error is $\sqrt{e_1^2+e_2^2}$ in which $e_1$ and $e_2$ are the voltage divider errors, and the maximum error is $e_1+e_2$.

The present invention provides a circuit for accomplishing the same result with the elimination of all voltage divider error. That is, the present invention converts a signal in terms of alternating current supply to a signal in terms of direct current supply, or vice versa, employing a voltage divider circuit, with complete elimination of all voltage divider error. By voltage divider error is meant error in proportionality between the mechanical positioning of the voltage divider slider and the resistance ratio at the slider contact. Since all voltage divider error is eliminated by this invention it is possible to use a non-precision type of voltage divider having a large error to secure results more precise than have been possible heretofore even when laboratory dividers of the highest precision were used.

The circuit of the invention consists of a voltage divider energized by both direct and alternating potentials. Two circuits are supplied from the voltage divider slider, one constituting an alternating current circuit with provision for removing direct potentials, and the other circuit a direct current circuit with provision for removing alternating potentials. One of the circuits constitutes the input and is associated with a servomechanism for positioning the slider in accordance with the input voltage value. The other circuit constitutes the output. In operation the signal in the output circuit varies linearly with the signal in the input circuit, while the alternating current signal contains only alternating voltage regulation errors and the direct current signal contains only direct voltage regulation errors.

Since this circuit effectively inserts the variations of the voltage supply circuits into the output signal, the circuit can be employed with voltage variations or modulations deliberately introduced. These variations appear as factors in the output signal, so that the circuit, in addition to its voltage-correction use, has utility as a special type of multiplying and dividing computer.

One purpose of this invention is to convert an electronic signal in terms of alternating current supply to an equivalent electronic signal in terms of direct current supply, or vice versa, by simple voltage divider means and at the same time eliminating voltage divider error.

Another purpose of this invention is to convert an input signal in terms of one kind of power supply to an output signal in terms of another kind of power supply, either or both supplies being deliberately modulated to introduce the modulations into the output signal.

The term servo device is used herein to refer generally to closed loop error signal feedback systems whether mechanical motion is involved or not.

The term servomechanism is used herein to refer to those servo devices which include mechanical motion.

Further understanding of this invention may be secured from the detailed description and drawings, in which:

Figure 1 schematically depicts a circuit for converting signals in direct-current terms to analogous signals in alternating-current terms and employing a single voltage divider, the voltage divider error being eliminated from the output.

Figure 2 schematically depicts a circuit for converting signals in alternating-current terms to analogous signals in direct-current terms.

Figure 1:
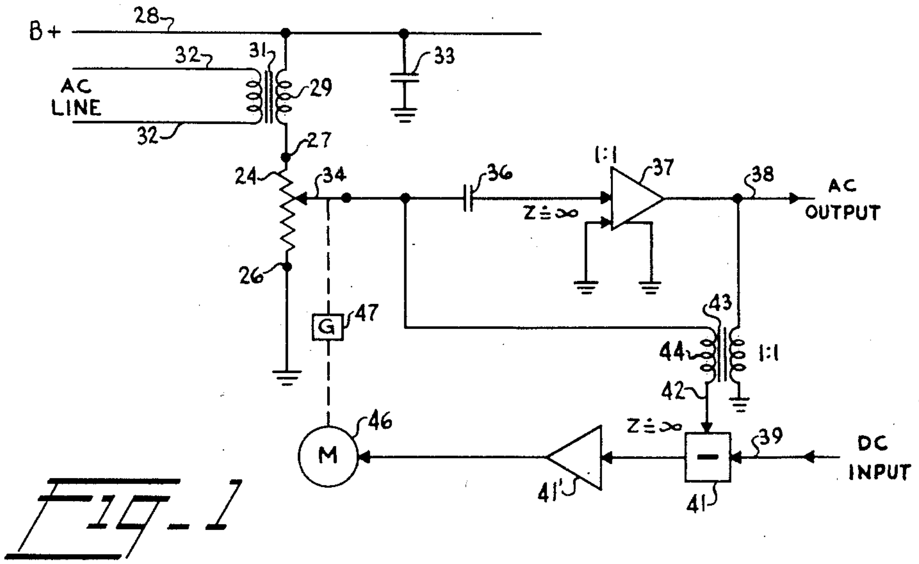

Referring now to Fig. 1, a single voltage divider 24 is employed as the computing element of the invention. Since the divider error will be shown to cancel out, linearity is not important and a low quality divider may be employed. However it should have good resolution and should be non-inductive and in general non-reactive. Its resistance will be dictated by conventional requirements of design. Merely as an indication, for usual laboratory magnitudes of signal a 10,000 ohm inexpensive composition or metal film voltage divider may be employed. The divider is connected for use with signals ranging from zero to some value of a selected sense or phase, and accordingly one end 26 is grounded and the other end 27 is connected to a grounded direct-current supply source represented by bus 28 and also to an alternating-current supply source in series therewith represented by the secondary winding 29 of a transformer 31 having its primary winding connected to alternating current supply mains 32. These power supplies represented at 28 and 32 each have some inherent independent voltage regulation. A filter represented by condenser 33 completes the alternating current path of secondary winding 29 and filters alternating current from the direct-current source, a more elaborate filter being employed when required.

The voltage divider slider 34 is connected through a blocking condenser 36 and a unity gain power amplifier 37 to alternating current output signal conductor 38. The input direct-current signal is applied from conductor 39 to a subtracting device 41 to which the potential of slider 34 is also applied through conductor 42. In order to eliminate alternating potential from conductor 42, the alternating potential output of amplifier 37 is applied through a unity voltage ratio transformer 43 in series with conductor 42, the phase of the potential derived from secondary winding 44 opposing in conductor 42 the phase of the potential derived from slider 34. Since both amplifier 37 and transformer 43 have unity ratios, the alternating potential magnitude derived from winding 44 equals that derived from slider 34, therefore the transformer 43 completely and exactly "bucks out" the alternating potential available at slider 34, leaving only direct potential at conductor 42 for application to the subtracting device 41. The ratio of amplifier 37 may be other than unity if at the same time the ratio of transformer 43 be changed to the inverse ratio. The subtracting device 41 may have any of several forms. For example, it may consist of a subtracting resistance network followed by a direct-coupled servo amplifier 41', a direct-coupled balanced stage of amplification, or a magnetic amplifier.

In all cases the input resistance at conductor 42 should be very high relative to the resistance of voltage divider 24. Likewise the input impedance of amplifier 37 should be very high compared to the impedance or resistance of the voltage divider. Alternatively, the input impedances of devices 41 and 37 may have lower values if they are similar in their relations to the resistance of the voltage divider. The output of amplifier 41' is applied to a servomechanism motor 46 which through step-down gearing 47 positions slider 34.

In operation, a direct-current signal is applied to conductor 39, creating an error signal at the output of amplifier 41' and rotating motor 46. This moves slider 34 in such direction as to tend to make the potential at conductor 42 equal to that at conductor 39, and at equality the motor and slider stop moving. At this position the alternating potential output at conductor 38 has been changed in proportion to the change in the input signal. It will be observed that the input signal is in terms of the potential of the direct-current supply bus 28, and is not affected by changes in the alternating supply voltage. Likewise, the output signal is in terms of the potential of the alternating current mains 32, and is not inherently affected by changes in the direct-current supply voltage.

In order to show that voltage divider error does not affect the accuracy of the output let the input signal potential magnitude by $E_{dc}$. This is equated by device 41 to the direct-current slider potential $E'_{dc}$, so that at servomechanism balance $$E_{dc}=E'_{dc} \qquad (1)$$

$E'_{dc}$ in terms of the direct-current supply voltage $V_{dc}$ and in terms of the resistance ratio $r$ of the divider at balance is $$E'_{dc}=V_{dc}r \qquad (2)$$

The resistance ratio of the non-inductive divider for alternating current is the same as its ratio for direct current, so that the alternating potential $E'_{ac}$ at slider 34 in terms of the alternating power supply potential $V_{ac}$ applied by secondary winding 29 is $$E'_{ac}=V_{ac}r \qquad (3)$$

It will be noted that the mechanical position of the voltage divider to secure the ratio $r$ is of no importance and does not enter the equations, and therefore non-linearity in positioning, or voltage divider error, does not enter. The output signal $E_{ac}$ is of course $E'_{ac}$ multiplied by the amplifier gain G, or $$E_{ac}=GE'_{ac} \qquad (4)$$

From Equations 1, 2, 3, and 4, $$E_{ac}=E_{dc}\frac{GV_{ac}}{V_{dc}} \qquad (5)$$

the divider ratio $r$ dropping out. That is, the output signal equals the input signal multiplied only by scale constants.

Equation 5 shows that the input signal is multipled by $V_{ac}$ and divided by $V_{dc}$. Thus the output signal $E_{ac}$ contains as factors both of these terms. When the invention is used to introduce the regulation or other fortuitous voltage variations of the supplies into the output, $E_{ac}$ varies directly as $V_{ac}$ and inversely as $V_{dc}$. When the invention is used as a means of deliberately introducing one or two independent variables, either or both $V_{ac}$ and $V_{dc}$ are regarded as these variables and Equation 5 shows that when $V_{ac}$ is the variable the device is a multiplier, and when $V_{dc}$ is the variable it is a dividing device.

The general circuit and method just described may be employed just as well when the input signal is an alternating quantity and the desired output signal is in terms of direct current. A circuit useful under these conditions is shown in Fig. 2, and differs from Fig. 1 principally in the position of the servomechanism, which must operate on an error signal derived from the A.-C. input signal.

Figure 2:
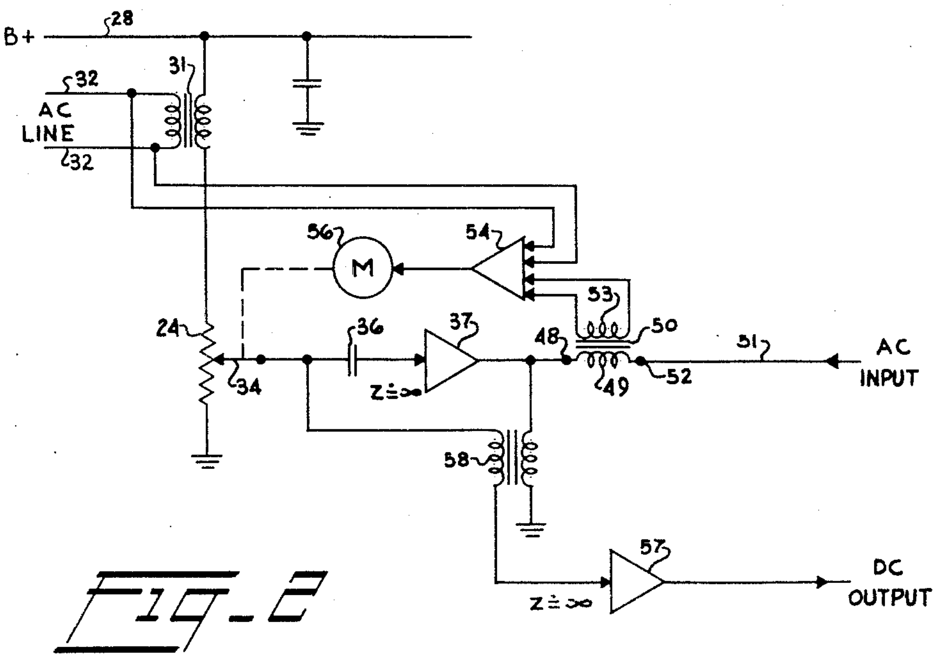

In Fig. 2 the voltage divider 24 is energized by alternating current through transformer 31 and by direct current from bus 28. Alternating slider potential is applied through blocking condenser 36 and power amplifier 37 having high input impedance to one terminal 48 of a transformer 50 primary winding 49. The alternating input potential signal is applied through conductor 51 to the other terminal 52 of the same winding 49. This input signal is derived from the same supply lines 32 powering transformer 31. It therefore is possible to have the same phases at terminals 48 and 52 and, if so, then at potential equality no current flows in the secondary winding 53. At potential inequality current flows in winding 53, operating a servomechanism motor 56 through a phase-sensitive servoamplifier 54, the direction of rotation of the motor being determined by the phase sense. Motor 56 therefore moves slider 34 in such direction as to reduce the error signal in winding 53 to zero. Any other subtracting device having phase sensitivity may be used instead of the transformer 50.

In thus moving slider 34 the direct potential thereof is made to represent linearly the alternating input potential signal. This potential is applied to a high input impedance amplifier 57 through a transformer winding 58 where the alternating potential is nullified, as before described. The output potential is not dependent upon voltage divider quality for reasons similar to those described previously.

It thus follows that the voltage divider converter-inverter is a bilateral device which as easily and accurately converts from alternating current to direct current signals as from direct current to alternating signals. Moreover, the device may be applied to convert alternating current at one frequency, derived from a suitable supply, to alternating current signals at another frequency in terms of a second suitable supply. In such a case it will merely be necessary to segregate the supply mains where applied to the voltage divider terminals by suitable filters, and similarly in the signal branches of the circuit to employ suitable filters as, for example, at the location of condenser 36. In general this invention linearly converts signals which are in terms of one kind of electrical power supply to signals which are in terms of another kind of electrical power supply.

Figure 3:
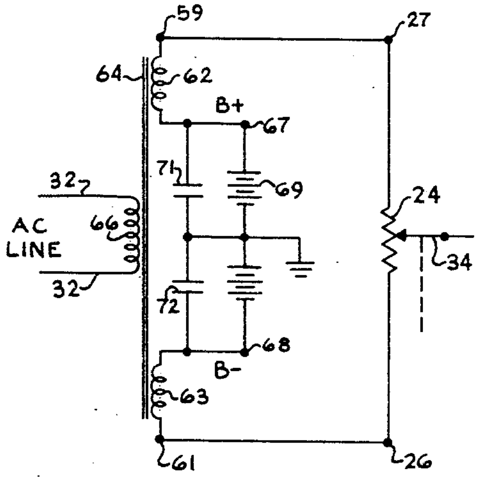
Figure 3 depicts the circuit of a voltage divider for use with signals varying above and below zero.

As the invention has been described it is applied to conversion of signals varying from zero to some value and not to signals varying through zero or in case of alternating signals, varying through a 180° phase change at zero intensity. The circuit of Fig. 3 illustrates voltage divider and power supply circuits which are adapted for use with such signals.

A voltage divider 24 as before described has its terminals 27 and 26 connected to terminals 59 and 61 of two similar secondary windings 62 and 63 of a power transformer 64. The primary winding 66 is connected to alternating current mains 32. The other secondary winding terminals 67 and 68 are connected to the two terminals of a direct current supply represented by center-tap-grounded battery 69. Center-tap-grounded by-pass condensers 71 and 72 prevent alternating current from traversing the battery and provide a low-impedance alternating current return path. The circuit of Fig. 3 when inserted in Fig. 1 in place of divider 24 and supplies there shown permits direct-current input signals ranging from "+" to "−" values to be applied, and the circuit when inserted in Fig. 2 in place of divider 24 and supplies permits alternating current input signals from values of one phase to values of the opposite phase to be applied with output signals ranging between positive and negative values analogously.

Figure 4:
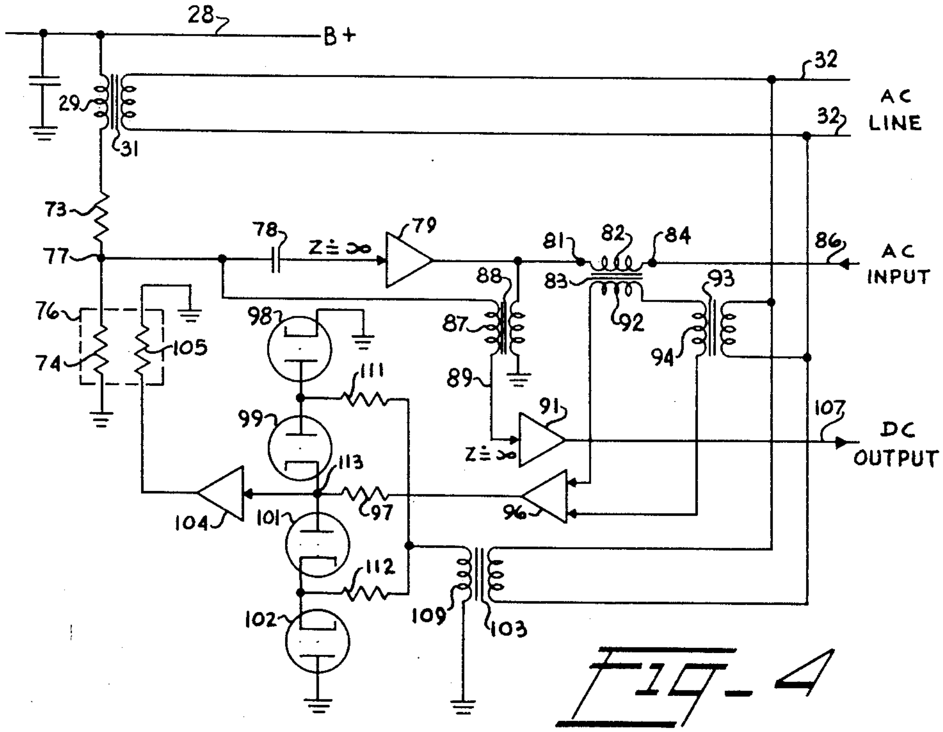
Figure 4 depicts a thermistor circuit for use in the circuits of Figs. 1 and 2 in place of a servomechanism.

The employment of servomechanisms is not essential in this invention, and any other feedback or closed loop servo device, not employing moving mechanical parts, may be employed instead. Such a device employing a thermistor is schematically shown in Fig. 4 with alternating current signal input and direct current output. A fixed resistor 73 is connected in series with the variable resistance element 74 of a thermistor 76, the two components together performing the function performed in the other embodiments by the voltage divider of conventional form, and in a sense constituting a voltage divider. The two components in series are connected between sources of alternating- and direct-current power and ground, the direct-current source being represented by the bus 28 and the alternating current source being represented by the secondary winding 29 of transformer 31 energized from line 32. The junction 77 is connected through a coupling condenser 78 and a 1:1 amplifier 79 having high input impedance to one terminal 81 of the primary winding 82 of a transformer 83. The other primary terminal 84 is connected to the input signal conductor 86. The output signal is derived from junction 77 through the secondary winding 87 of a 1:1 transformer 88 excited from the output of amplifier 79, so that all of the alternating signal is nullified as before described in the direct-current output signal conductor 89. A high impedance input amplifier 91 is provided in this conductor.

The error signal derived from the secondary winding 92 of transformer 83 may vary either side of zero with opposed phase. In order to secure phase-sensitive operation of the thermistor, a transformer 93 is energized from the alternating supply mains 32 and its secondary winding 94 is connected in series with winding 92, providing a fixed voltage at a selected phase. The outputs of transformers 83 and 93 combined in series are applied to an amplifier 96 having a moderate gain so as to provide a signal at a resonable level for application to a phase sensitive device, the purpose of which is to prevent inadvertent phase reversal of the control signal to the thermistor. This phase-sensitive device consists of resistor 97, four diodes 98, 99, 101 and 102, the diodes being of any rectifying type such as tubes, contact rectifiers or crystal rectifiers, and a transformer 103 energized from the alternating mains 32. The output is amplified in amplifier 104 and applied to the heater winding 105 of thermistor 76.

Figure 5:
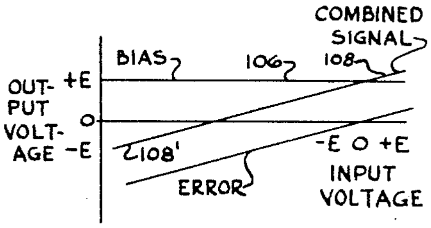
Figure 5 is a graph illustrating the operation of the thermistor circuit of Fig. 4.

In operation, an error signal representing the potential difference and phase sense of terminals 81 and 84 is developed at winding 92. This signal is added to a bias voltage signal secured from winding 94 to form a biased error signal as indicated in the graph of Fig. 5. In this graph the abscissae are the input error voltage of winding 92. The line 106 represents the bias voltage of winding 94. The ordinates represent the sum voltage applied to amplifier 96. This voltage as well as the abscissa voltage is represented as positive or negative, it being understood that alternating voltages of a selected phase are termed and represented as positive and voltages of the opposite phase are negative. The output signals are applied to amplifier 96, and after amplification and passage through protective resistor 97, are amplified again at 104 and applied to the thermistor heater 105, producing a selected current through it. Increase of this current changes the resistance of resistor 74 in one direction and decrease changes its resistance in the other direction. Resistance changes are in such direction as to tend to bring the potential of terminal 81 into equality with terminal 84. A very slight differential existing at virtual balance, amplified by amplifiers 96 and 104, causes such current in heater 105 as to bring terminal 77 to the proper potential. This also causes the analogous direct-current potential to be applied through amplifier 91 to the output conductor 107.

Operation as described is on that part of the sum curve 108, Fig. 5, that is above the zero ordinate. If, however, at starting or for any reason the error signal should overpower the bias voltage, operation would ensue on branch 108' below the zero ordinate and the feedback circuit, instead of bringing the error signal toward null would cause it to run away. To prevent this, transformer 103 applies potential from secondary winding 109 through protective resistors 111 and 112 to diodes 98 and 102, which become conductive on alternate half cycles. When the potential applied through resistor 97 to junction 113 has a selected phase, it causes diodes 99 and 101 to become conductive in alternation, in concert with diodes 98 and 102, so that during both halves of the cycle the junction 113 is grounded through one or the other pair of diodes. If the phase at junction 113 is opposite, then when diode 98 is closed, diode 99 is open, and vice versa, and similarly for diodes 101 and 102 so that the junction is insulated from ground at all times. Polarities are so arranged that operation on the branch 108, Fig. 5, is permitted and operation on branch 108' is not permitted.

What is claimed is:

1. An electrical signal power supply transfer circuit comprising, a single voltage divider energized at its end terminals by both first and second power supplies having distinguishing output qualities, a servo device connected to the voltage dividing terminal of said voltage divider, an input circuit applying a first signal in terms of said first power supply output quality to said servo device for adjusting said voltage divider to agreement therewith, and an output circuit extracting a second signal in terms of said second power supply output quality and directly and proportionally representative in magnitude of the magnitude of said first signal derived from the voltage dividing terminal of said voltage divider.

2. An electrical signal power supply transfer circuit for transforming a signal in terms of a first power supply circuit having a first frequency within a range including zero frequency to a signal in terms of a second power supply circuit having a second different frequency within a range including zero frequency comprising, a single voltage divider having two end terminals and an intermediate voltage divided terminal, means for energizing said voltage divider end terminals from said first power supply circuit, means for simultaneously energizing said voltage divider end terminals from said second power supply circuit, a servo device connected to said voltage divider for adjustment thereof, an input circuit applying a first signal in terms of said first frequency power supply to said servo device adjusting said voltage divider to agreement therewith, and an output circuit extracting a second signal in terms of said second frequency power supply and directly proportionately representative of the magnitude of said first signal from the intermediate terminal of said voltage divider.

3. An electrical signal power supply transfer circuit for transforming a signal in terms of one power supply circuit to a signal in terms of another power supply circuit comprising, a single voltage divider having two end terminals and an intermediate voltage divided terminal, means for energizing said voltage divider end terminals by a direct-current power supply and an alternating-current power supply simultaneously, a servo device connected to said voltage divider for adjustment thereof, an input circuit applying an input signal in terms of one of said power supply potentials to said servo device whereby said voltage divider divides both said impressed power supply voltages in accordance therewith at said intermediate terminal, and an output circuit extracting an output signal proportional to said input signal from said intermediate terminal, said output signal being in terms of the other of said power supply potentials.

4. An electrical signal power supply transfer circuit in accordance with claim 3 in which said servo device is a servomechanism.

5. An electrical signal power supply transfer circuit in accordance with claim 3 in which said servo device comprises a thermistor.

6. An electrical signal power supply transfer circuit for transforming a signal in terms of a direct-current power supply potential to a proportional signal in terms of an alternating current power supply potential comprising, a single voltage divider having two end terminals and a slider, means for energizing said voltage divider end terminals by said direct-current power supply potential and said alternating-current power supply potential simultaneously, a servomechanism connected to said slider for adjustment thereof, an input circuit applying an input signal in terms of said direct-current power supply potential to said servomechanism whereby said slider is servoed to a position representative thereof, said alternating and direct current voltage divider supply potentials being proportionally divided at said slider with elimination of slider error, and an output circuit extracting an output signal proportional to said input signal form said slider, said output signal being in terms of said alternating-current power supply potential.

7. An electrical signal power supply transfer circuit for transforming a signal in terms of an alternating-current power supply potential to a proportional signal in terms of a direct-current power supply potential comprising, a single voltage divider having two end terminals and a slider, means for energizing said voltage divider end terminals by said direct-current power supply potential and said alternating-current power supply potential simultaneously, a servomechanism connected to said slider for adjustment thereof, an input circuit applying an input signal in terms of said alternating-current power supply potential to said servomechanism whereby said slider is servoed to a position representative thereof, said alternating- and direct-current voltage divider supply potentials being proportionately divided at said slider with elimination of slider error, and an output circuit extracting an output signal proportional to said input signal from said slider, said output signal being in terms of said direct-current power supply potential.

8. An electrical signal power supply transfer circuit for transforming a signal in terms of a direct-current power supply potential to a proportional signal in terms of an alternating-current power supply potential comprising, a single voltage divider having two end terminals and a slider, circuit means applying said direct-current power supply potential across said end terminals, a transformer energized by said alternating-current supply potential and having its secondary winding interposed in series between said voltage divider and said direct-current power supply, a servomechanism including a motor connected to position said slider, a capacitor having one terminal connected to said slider, a high input impedance selected gain alternating-current amplifier having an input terminal connected to the other terminal of said capacitor, a transformer having a voltage step-down ratio equal to said selected gain having its primary winding connected across the output of said amplifier and having one secondary winding terminal connected to said slider whereby the alternating-current slider potential is neutralized and eliminated between the other terminal of said last-named secondary winding and one of said two end terminals, signal substracting means having high input impedance connected to said other terminal and to means for applying an input signal in terms of said direct-current power supply potential to form an error signal, means applying said error signal to said motor, and means for deriving an output signal in terms of said alternating-current power supply potential representative of said input signal from the output of said alternating-current amplifier.

9. An electrical signal power supply transfer circuit for transforming a signal in terms of an alternating-current power supply potential to a proportional signal in terms of a direct-current power supply potential comprising, a single voltage divider having two end terminals and a slider, a transformer energized by said alternating-current power supply potential and having its secondary winding connected in series with said two end terminals, circuit means applying said direct-current power supply potential across said secondary winding and said two end terminals in series, a servomechanism including a motor connected to position said slider, a capacitor having one terminal connected to said slider, a high impedance selected gain alternating current amplifier having an input terminal connected to the other terminal of said capacitor, a transformer having a voltage step-down ratio equal to said selected gain having its primary winding connected across the output of said amplifier and having one secondary winding terminal connected to said slider whereby the alternating current slider potential is neutralized and eliminated between the other terminal of said last named secondary winding and one of said two end terminals, a high input impedance direct-coupled amplifier connected to said other terminal producing an output signal in terms of said direct-current power supply potential, an alternating-current signal subtracting device having phase sensitivity, means for applying an input signal in terms of said alternating-current power supply potential to said subtracting device, a circuit applying the output of said alternating-current amplifier to said signal subtracting device, an alternating-current phase sensitive amplifier, means applying the output difference signal from said subtracting device to said alternating-current phase sensitive amplifier, and means applying the output of said alternating-current phase sensitive amplifier to said motor.

10. An electrical signal power supply transfer circuit for transforming an input signal in terms of an alternating-current power supply potential to a proportional output signal in terms of a direct-current power supply potential comprising, a resistor and the resistance winding of a thermistor connected in series at a common junction to form a voltage divider, a transformer energized by said alternating-current power supply potential having its secondary winding connected to said resistor, means connecting said direct-current power supply potential across said secondary winding said resistor and said resistance winding in series, a capacitor connected at one terminal to said common junction, a high input impedance selected gain alternating-current amplifier connected to the other terminal of said capacitor, a transformer having a voltage step-down ratio equal to said selected gain and energized by the output of said alternating-current amplifier, a connection between said common junction and one terminal of the secondary winding of said step-down transformer, a direct-coupled amplifier having high input impedance excited from the other terminal of said step-down transformer secondary winding, the output of said direct coupled amplifier constituting said output signal, a subtracting device, means applying said input signal to said subtracting device, means applying the output of said alternating-current amplifier to said subtracting device, a bias transformer energized by said alternating-current power supply potential, circuit means adding the output of said bias transformer in series with the output of said subtracting device to secure a phase-sensed difference signal, an amplifier excited by said phase-sensed difference signal, a resistor having one terminal connected to the output of said last-named amplifier, means for grounding the other resistor terminal when the error signal thereon is of one phase and having high impedance to ground when the error signal is of the opposite phase sense, an amplifier connected for excitation from said other resistor terminal, and means connected said last-named amplifier output to the heater winding of said thermistor.

11. An electrical signal power supply transfer circuit in accordance with claim 10 in which said means for grounding comprises four rectifiers connected in a four-arm bridge circuit having a sensing potential applied between two diagonally opposite terminals and having the error signal applied between the other two diagonally opposite terminals.

References Cited in the file of this patent

UNITED STATES PATENTS

| | | |
|---|---|---|
| 2,560,170 | Gray | July 10, 1951 |
| 2,624,505 | Wing | Jan. 6, 1953 |
| 2,697,191 | Wannamaker | Dec. 14, 1954 |